United States Patent [19]

Peemöller et al.

[11] Patent Number: 4,697,049
[45] Date of Patent: Sep. 29, 1987

[54] DEVICE FOR PRODUCING X-Y COORDINATE ADDRESSES FOR A PICTURE SCREEN

[75] Inventors: Horst Peemöller; Heino Svensson, both of Hamburg, Fed. Rep. of Germany

[73] Assignee: U.S. Philips Corporation, New York, N.Y.

[21] Appl. No.: 886,572

[22] Filed: Jul. 16, 1986

[30] Foreign Application Priority Data

Jul. 17, 1985 [DE] Fed. Rep. of Germany ....... 3525499

[51] Int. Cl.⁴ .............................................. G08C 21/00
[52] U.S. Cl. ..................................... 178/18; 340/718; 177/211
[58] Field of Search ............................ 178/18, 19, 20; 177/210 R, 211, 199; 364/521; 73/862.64; 338/2; 340/718, 706

[56] References Cited

U.S. PATENT DOCUMENTS

| 4,121,049 | 10/1978 | Roeber | 178/18 |
| 4,511,760 | 4/1985 | Garwin et al. | 178/18 |
| 4,558,757 | 12/1985 | Mori et al. | 178/18 |

*Primary Examiner*—Stafford D. Schreyer
*Attorney, Agent, or Firm*—David R. Treacy

[57] ABSTRACT

The invention relates to a device for producing x-y coordinate addresses for a picture screen comprising a force-sensitive operating plate (3) influencing force measuring sensors (13a, 13b, 15a, 15b). The coordinates of points on the plate surface (23) are converted, when a force is exerted on these points, by the force measuring sensors (13a, 13b, 15a, 15b) into electrical signals, which correspond to an x-y coordinate address, which is accurately identical to the geographical place of the pressure point of the picture screen. The operating plate (3) has first side edges (17, 17b) arranged approximately parallel and opposite to each other and second side edges (19a, 19b) shifted by about 90° with respect to the first side edges and also arranged parallel and opposite to each other. Auxiliary plates (103, 203) are arranged behind the opeating plate (3) in planes parallel to it. The plates (3, 103, 203) are interconnected by means of resilient edge supports, the resilient edge supports (9a, 9b, 11a, 11b) being obtained from plate to plate longitudinally in the same direction between side edges (17a, 17b, 117a, 117b, 217a, 217b) extending parallel to and over each other and being shifted from plate to plate always alternately by each time about 90° from the first to the second side edges and conversely. The force measuring sensors (13a, 13b and 15a, 15b, respectively) are arranged halfway between the resilient edge supports (9a, 9b and 11a, 11b, reslectively) adjacent the plate edges.

5 Claims, 2 Drawing Figures

DEVICE FOR PRODUCING X-Y COORDINATE ADDRESSES FOR A PICTURE SCREEN

BACKGROUND OF THE INVENTION

The invention relates to a device for producing x-y coordinate addresses for a picture screen comprising a force sensitive transparent operating plate influencing force measuring sensors. When a force is exerted on the surface of the operating plate, the force measuring sensors produce at the pressure point electrical signals resulting from a change in the sensor electrical parameters, which are converted in an electronic system into digital x-y coordinate addresses, which accurately correspond to the geographical place of the pressure point on the picture screen. The operating plate has first side edges arranged approximately parallel and opposite to each other and second side edges shifted by about 90° with respect to the first side edges and also arranged approximately parallel and opposite to each other. The operating plate is arranged on resilient edge supports. The mechanical device is mounted in the front frame of a high resolution monitor before the picture tube and is used as a touch panel.

Such a device is known from German patent application No. 3420701. With the operating plate of rectangular shape, the force measuring sensors are arranged at the corners of the plate. It has been found that the coordinates of a point loaded by pressure on the surface of the plate in this case deliver electrical signals corresponding only theoretically to point coordinates. In practice it is found that in a device with the force measuring sensors at the corners of the plate the desired signals are only obtained when a pressure is exerted on the operating plate adjacent the center of the plate.

SUMMARY OF THE INVENTION

The invention has for its object to provide a device for producing x-y coordinate addresses for a picture screen, in which forces are exerted from each point of the plate on the force measuring sensors below the operating plate which are distributed so that an x-y coordinate address is obtained.

According to the invention, this object is achieved by (a) auxiliary plates arranged behind the operating plate in planes parallel to it, (b) a resilient edge support of all plates with respect to each other, the resilient edge support being arranged from plate to plate longitudinally in the same direction between side edges extending parallel to and over each other and being shifted from plate to plate always alternately by each time about 90° from the first to the second side edges and conversely, and (c) force measuring sensors arranged halfway between the resilient edge supports adjacent the plate edges.

With such an arrangement of the measuring sensors with respect to the operating plate and the auxiliary plates and the resilient support of the plates with respect to each other, forces are exerted on the force measuring sensors from each point of the surface of the operating plate. These forces are distributed so that the force measuring sensors supply the corresponding signals for producing an x-y coordinate address.

According to a further embodiment of the invention the individual resilient supports consist of beams which each extend between two side edges located one above the other. One of its two ends is pivotally connected to the edge of the plate located before it, and the other end is pivotally connected to the edge of the plate located behind it. With such a resilient support of the operating plate and of the auxiliary plates with respect to each other, a sufficiently rigid and flat construction is obtained so that the arrangement occupies only a limited amount of space in front of the image screen of a picture tube.

According to a further embodiment of the invention the auxiliary plates have a central recess, which approximately corresponds to the picture screen of a picture tube arranged behind it. By means of the recesses, it is avoided that dirt deposits accumulating on the auxiliary plates lead to picture errors. When the recesses are provided, only the operating plate itself is disposed before the picture screen. The auxiliary plates take the form of a kind of frame due to the provision of the recesses. Such a frame-shaped form is quite satisfactory however, for the desired operability.

In order that the invention may be readily carried into effect, it will be described more fully with reference to the accompanying drawing.

DESCRIPTION OF THE PREFERRED EMBODIMENT

Figure 1:
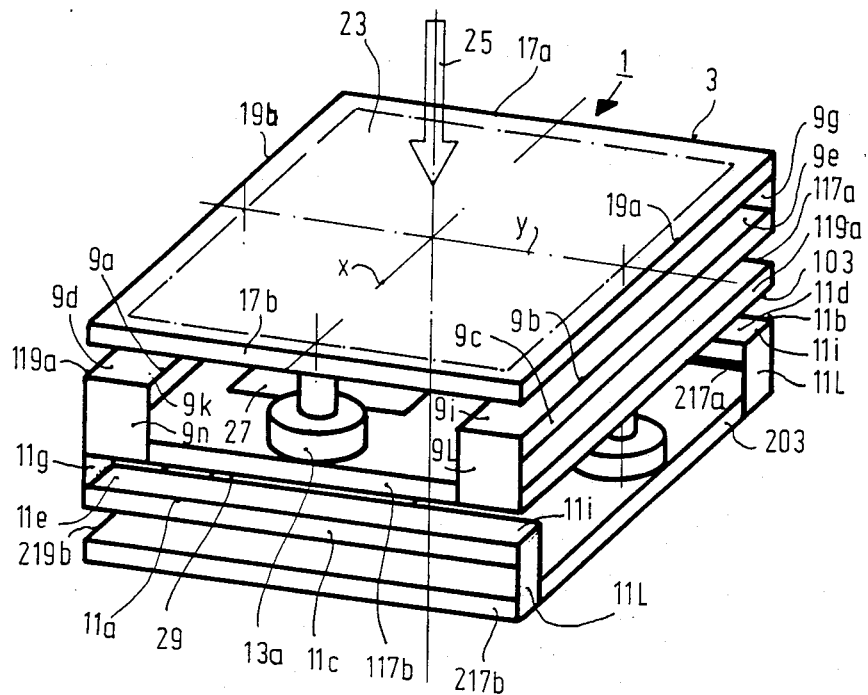
FIG. 1 shows a device for producing x-y coordinate addresses for a picture screen of high resolution, which is arranged above the picture screen of a picture tube, in perspective view.

The device for producing x-y coordinate addresses for a picture screen of high resolution shown in FIG. 1 is arranged in front of the picture screen of a picture tube. In FIG. 1, the dimensions of the device are changed in order to clarify their mode of operation. In a practical embodiment, the device has a flatness of only a few millimeters; it has an extension of the order of magnitude of a picture screen before which it should be arranged. For the sake of simplicity, the holding element with which the device is mounted in front of the picture screen is not shown in the drawing either.

The device 1 for producing x-y coordinate addresses for a picture screen of high resolution is fixedly arranged in front of the picture screen of a picture tube (not shown). The device 1 consists of three plates, i.e. of a foremost operating plate 3 and two auxiliary plates 103 and 203 disposed parallel to the operating plate 3 behind the latter at a certain distance. the plates 3, 103 and 203 are interconnected by means of resilient edge supports 9a, 9b and 11a, 11b. Moreover, force measuring sensors 13a and 13b and 15a, 15b, respectively, are arranged between the plates.

The operating plate 3 is of substantially rectangular form and has first side edges 17a and 17b arranged parallel and opposite to each other and second side edges 19a and 19b shifted by about 90° C. with respect to the side edges 17a and 17b and also arranged parallel and opposite to each other.

Figure 2:
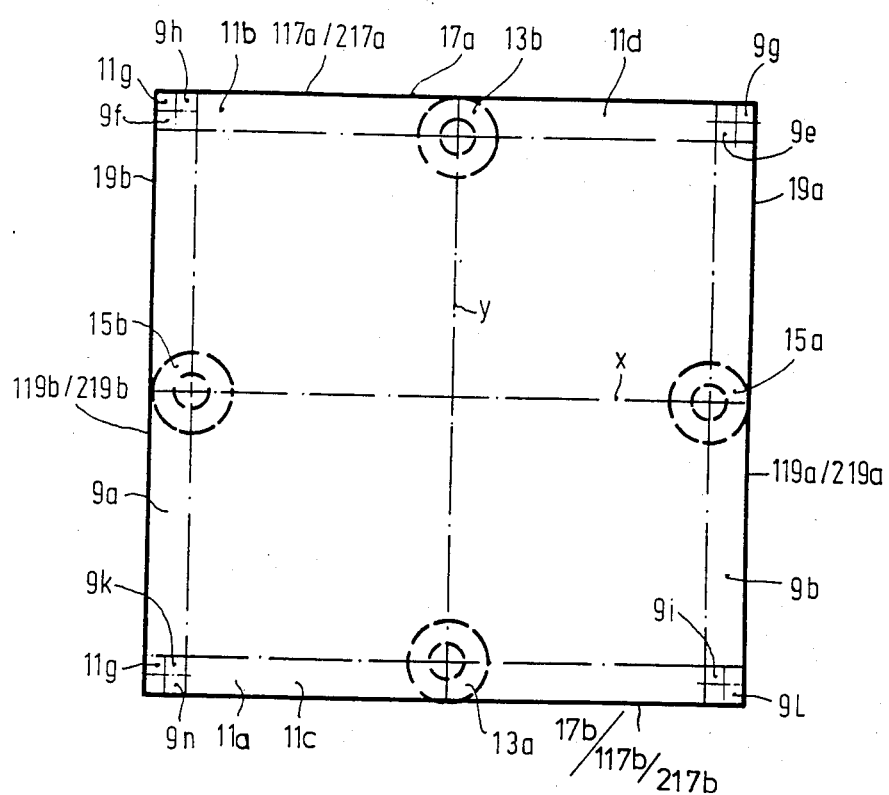
FIG. 2 shows a plan view of the device, the arrangement of the force measuring sensors and the resilient supports being represented so as to be projected through the plates.

The resilient supports 9a and 9b between the operating plate 3 and the auxiliary plate 103 each have a beam 9d and 9c. The operating plate 3 and the plate 103 have such a relative distance that the beams 9c and 9d extend parallel to the side edges 19a, 19b and 19b, 119b (see FIG. 2) respectively so to be freely movable between them. The beams 9c and 9d are connected to the operating plate 3 by their rear ends 9e, 9f (as shown in FIG. 2) through flexible stays 9g and 9h (see FIG. 2). The front ends 9i and 9k (as shown in FIG. 1) are connected through flexible stays 9l and 9n to the auxiliary plate 103.

A corresponding resilient support is disposed between the auxiliary plates 103 and 203. The beams 11c and 11d are shifted by 90° with respect to the beams 9c and 9d. This means that the beam 11c extends between the side edges 117b and 217b of the auxiliary plates 103 and 203 and parallel to these side edges. The beam 11d extends correspondingly parallel to the side edges 117a and 217a and between the latter. The beams 11c and 11d are connected to the auxiliary plate 103 by their ends 11e on the left-hand side in the drawing through elastic connections 11g, while the righthand ends 11i are connected through elastic connections 11l to the auxiliary plate 203 disposed therebehind.

Halfway between the resilient edge supports 9a and 9b, the force measuring sensors 13a, 13b (see FIG. 2) are arranged on the line x at the side edges 17a, 117a and 17b, 117b. Between the auxiliary plates 103 and 203, the force measuring sensors 15a and 15b (see FIG. 2) are arranged between the resilient supports 11a and 11b on the line y. The force measuring sensors 15a and 15b are again disposed at the side edges 119a, 219a and 119b, 219b (as shown in FIG. 2).

When by means of a finger or a pin, a force is exerted at an arbitrary point on the surface 23 of the operating plate 3, which is indicated by an arrow 25, the x-y coordinates of the pressure points supply differently distributed pressure values on the force measuring sensors 13a, 13b, 15a, 15b, which are converted into electrical signals, which correspond each to an x-y coordinate address, which is accurately identical to the geographical place of the pressure point on the picture screen of high resolution.

At the center of the auxiliary plates 103, 203, recesses 27, 29 are provided, which expose the picture screen above the picture tube (not shown in the drawing).

What is claimed is:

1. A device for producing x-y coordinate addresses for a picture screen, comprising
    a plurality of force measuring sensors,
    an operating plate having a force-sensitive transparent surface which influences said force measuring sensors, so that when a force is exerted at a pressure point on said surface of said operating plate, said force measuring sensors produce pressure point electrical signals, and
    an electronic system for converting said signals into digital x-y coordinate addresses which accurately correspond to a geographical place of said pressure point on said picture screen,
    said operating plate having first side edges arranged approximately parallel and opposite to each other and second side edges shifted by about 90° with respect to the first side edges and also arranged approximately parallel and opposite to each other, said operating plate being arranged on resilient supports; and characterized by comprising
    (a) a plurality of auxiliary plates arranged behind said operating plate in planes parallel to it, said operating plate and said auxiliary plates forming respective pairs of plates;
    (b) a pair of resilient edge supports disposed between each pair of said plates, each of said pair of resilient edge supports being arranged between said respective pairs of said plates longitudinally in the same direction between said side edges extending parallel to and over each other, and further being shifted for said respective pairs of said plates alternately about 90° from said first to said second side edges and conversely; and
    (c) further characterized in that said force measuring sensors are arranged halfway between each pair of said resilient edge supports, each of said force measuring sensors being adjacent said side edges of said plates.

2. A device as claimed in claim 1, characterized in that each of said resilient supports consists of a beam, which each extends between two side edges disposed one above the other, each one of its ends being pivotally connected to said edge of said plate arranged before it, and the other of its ends being pivotally connected to said edge of said plate arranged behind it.

3. A device as claimed in claim 2, characterized in that each of said auxiliary plates has a central recess, which approximately corresponds to said picture screen of a picture tube arranged behind it.

4. A device as claimed in claim 1, characterized in that each of said auxiliary plates has a central recess, which approximately corresponds to said picture screen of a picture tube arranged behind it.

5. A device for producing X-Y coordinate signals for picture screen comprising:
    (a) a first, a second and a third operating plate, each plate respectively having a first side edge opposite a third side edge and a second side edge opposite a fourth side edge said plates being arranged in substantially successive parallel planes, said first operating plate having a force-sensitive transparent surface;
    (b) a first pair of resilient edge supports being disposed between said first and second operating plates, each of said first pair of edge supports being arranged longitudinally alongside said second and fourth side edges respectively, each of said edge supports having one of its ends flexibly coupled to said first side edge of said first operating plate, and the other of its ends flexibly coupled to said third side edge of said second operating plate;
    (c) a second pair of resilient edge supports being disposed between said second and third operating plates, each of said second pair of edge supports being arranged longitudinally alongside said first and third side edges respectively, each of said edge supports having one of its ends flexibly coupled to said second side edge of said second operating plate, and the other of its ends flexibly coupled to said fourth side edge of said third operating plate;
    (d) a first pair of force measuring sensors having electrical parameters corresponding to forces exerted on said first operating plate, each of said sensors being disposed between said first and second operating plates, one of said sensors being arranged adjacent said first side edge of said second operating plate, the other of said sensors being arranged adjacent said third side edge of said second operating plate, each of said sensors being further arranged substantially halfway between said resilient edge supports; and (e) a second pair of force measuring sensors having electrical parameters corresponding to forces exerted on said first operating plate, each of said sensors being disposed between said second and third operating plates, one of said sensors being arranged adjacent said second side edge of said third operating plate, the other of said sensors being arranged adjacent respective said fourth side edge of said third operating plate, each of said sensors being further arranged substantially halfway between said resilient edge supports;

whereby when a force is exerted at a pressure point on said surface of said first operating plate, said force measuring sensor electrical parameters accurately correspond to a geographical place of said pressure point on said picture screen.

* * * * *